United States Patent
Koochakzadeh et al.

(10) Patent No.: US 10,802,896 B2
(45) Date of Patent: Oct. 13, 2020

(54) REST GATEWAY FOR MESSAGING

(71) Applicant: SAP SE, Walldorf (DE)

(72) Inventors: Negar Koochakzadeh, Vancouver (CA); Alexei Potiagalov, Richmond (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/177,923

(22) Filed: Nov. 1, 2018

(65) Prior Publication Data

US 2020/0142759 A1    May 7, 2020

(51) Int. Cl.
*G06F 9/44*    (2018.01)
*G06F 9/54*    (2006.01)

(52) U.S. Cl.
CPC .............. *G06F 9/546* (2013.01); *G06F 9/547* (2013.01)

(58) Field of Classification Search
CPC ........................................................ G06F 9/546
USPC ........................................................ 719/314
See application file for complete search history.

(56) References Cited

U.S. PATENT DOCUMENTS

| 2014/0032531 A1* | 1/2014 | Ravi | ...................... G06Q 30/04 707/722 |
| 2016/0269348 A1* | 9/2016 | Beardsmore | ............ G06F 9/542 |

* cited by examiner

*Primary Examiner* — Timothy A Mudrick
(74) *Attorney, Agent, or Firm* — Buckley, Maschoff & Talwalkar LLC (57) ABSTRACT

A system includes reception, at a first computing node in a cluster of computing nodes, of a request to subscribe to a first message queue of a messaging middleware software component, determination, at the first computing node, of a preferred number of computing nodes of the cluster of computing nodes to listen to the first message queue, determination, at the first computing node and based on data stored in a shared database accessible to each computing node of the cluster, a current number of computing nodes of the cluster which are listening to the first message queue, and, based on a difference between the preferred number and the current number, sending one or more requests to the messaging middleware software component to associate one or more of the computing nodes of the cluster with the first message queue.

14 Claims, 9 Drawing Sheets

| Listener | CheckPoint |
|---|---|
| 315a | HH:MM:SS |
| 315b | HH:MM:SS |
| 315c | HH:MM:SS |
| 315d | HH:MM:SS |

| Recovery Node | Token Expiration |
|---|---|
| 315a | HH:MM:SS |
| | |

| Queue | Consumers (callback) | Listeners |
|---|---|---|
| Q₂ | 362_routing_info | 315a, 315b, 315d, 315f |
|  |  |  |

*FIG. 14*

REST GATEWAY FOR MESSAGING

BACKGROUND

Within a distributed computing system, various software components are required to communicate with one another. A message-producing component may communicate directly with a message-consuming component through a mutually-supported synchronous communication protocol. The traditional approach is unsuitable for distributed systems (e.g., cloud-based systems, on-premise systems), in which the availability of the target message-consuming component cannot be assured.

Messaging middleware may provide loosely-coupled communication in distributed systems. Messaging middleware allows the software components of distributed systems to communicate indirectly with each other via a subscription mechanism. Messaging middleware may also support various messaging Application Programming Interfaces (APIs), thereby allowing heterogeneous software components to communicate with one another asynchronously.

In some instances, a software component is unable to use any of the messaging APIs supported by the available messaging middleware. For example, a Web service software component may only support HyperText Transfer Protocol (HTTP) Representational State Transfer (REST) messaging. However, due to the stateless, request/response characteristics of HTTP REST APIs, available messaging middleware might not support HTTP REST APIs. The Web service software component is therefore unable to use the asynchronous messaging capabilities of the messaging middleware, limiting scalability and reliability of the Web service.

Systems are needed to provide high-availability asynchronous messaging between components using messaging APIs supported by available messaging middleware, and components which do not use messaging APIs supported by the available messaging middleware.

DETAILED DESCRIPTION

The following description is provided to enable any person in the art to make and use the described embodiments. Various modifications, however, will be apparent to those in the art.

Some embodiments address the foregoing by providing a service to communicate with producing and consuming components via APIs (e.g., REST APIs, Simple Object Access Protocol (SOAP) APIs) not supported by messaging middleware, and to communicate with the messaging middleware using APIs supported by the messaging middleware. This service may thereby support publish and subscribe requests received from the producing and consuming components, increasing scalability of the distributed system.

According to some embodiments, the service propagates messages to and from the messaging middleware without storing the messages, and sends a success acknowledgment to the messaging middleware only if a message has successfully reached its final consumer. If delivery of a message to a final consumer fails, the service will reject receipt of the message from the messaging middleware, which will then determine whether and how to retry sending the message.

Figure 1:
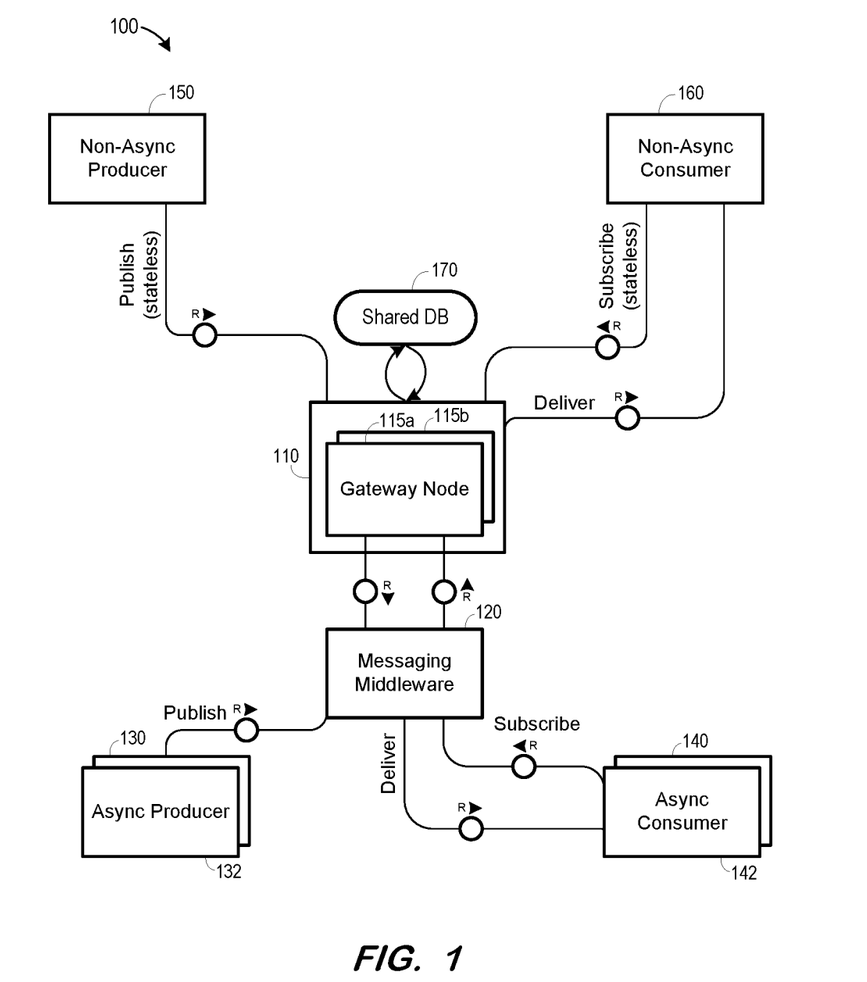
FIG. 1 is a diagram of an architecture supporting messaging between heterogeneous consumers and producers according to some embodiments.

FIG. 1 is a block diagram of system 100 according to some embodiments. Gateway 110 provides the gateway service described herein, and includes gateway nodes 115*a*, 115*b*. Gateway nodes 115*a*, 115*b* comprise a cluster of flat nodes in which no node acts as coordinator and all nodes execute the same processes as described herein. Gateway 110 may include any number of gateway nodes, and the number of gateway nodes may expand and contract during operation, due to node failure or due to determinations to add or remove nodes based on workload, cost, resources, etc.

Gateway 110, and each other component described herein, may be implemented by one or more computing devices (e.g., computer servers), storage devices (e.g., hard or solid-state disk drives), and other hardware as is known in the art. The components may be located remote from one another and may be elements of one or more cloud computing platforms, including but not limited to a Software-as-a-Service, a Platform-as-a-Service, and an Infrastructure-as-a-Service platform. According to some embodiments, each gateway node 115 is implemented by a dedicated virtual machine.

Gateway 110 communicates with messaging middleware 120 to publish messages into messaging middleware 120 and subscribe to receive messages from messaging middleware 120 as is known in the art. For example, the communication between gateway 110 and messaging middleware 120 may be based on Java Message Service (JMS) APIs designed to exchange publish and subscribe requests. Similarly, producers 130, 132 and consumers 140, 142 may comprise Java applications which communicate with messaging middleware 120 using the JMS publish/subscribe APIs. Producers 130, 132 and consumers 140, 142 are labeled asynchronous producers/consumers to indicate their support for asynchronous messaging protocols. Embodiments are not limited to publishing and subscribing using JMS APIs. That is, messaging middleware 120 may support any one or more publish/subscribe protocols that are or become known.

Producer 150 and consumer 160 may communicate with gateway 110 to publish and subscribe to messages using APIs that are not supported by messaging middleware 120. In this regard, producer 150 and consumer 160 are labeled as non-asynchronous in view of their use of a non-asynchronous protocol (e.g., REST APIs) to communicate with gateway 110. Producer 150 and consumer 160 may comprise components of a Web service (e.g., a database application server) according to some embodiments.

In operation, gateway 110 receives publish and subscribe requests from producer 150 and consumer 160 and delivers each request to one node, 115*a*, 115*b* based on load balancing algorithms. Upon receipt of a publish request, the receiving node simply propagates the message to middleware 120 using its asynchronous protocol (e.g., JMS APIs) and returns an acknowledgement to the requestor (e.g., producer 150). If the message delivery fails, the receiving node of gateway 110 returns a rejection to the requestor, who decides whether and how to retry sending the message.

Upon receipt of a subscription request from consumer 160, the receiving node ensures that a number of nodes of gateway 110 are established as listeners to an appropriate message queue of middleware 120. Establishment of listeners according to some embodiments is described below. The subscription request includes a callback API to the consumer. The callback API/protocol may differ from the API/protocol used to request the subscription. For example, the callback may comprise a SOAP or Remote Procedure Call callback. If a message is received at the queue, messaging middleware 120 propagates the message to one of the listeners, which in turn delivers the message the subscribed consumer using the callback API. The listening node sends an acknowledgement to messaging middleware 120 if delivery to the consumer is successful, and a rejection if delivery fails.

State information for each subscription is maintained in shared database 170, accessible by each node of gateway 110. The state information may include the queue, the listeners associated with the queue, and the consumers of the queue and their associated callbacks. Some embodiments operate as described below to establish listeners conforming to an already-specified and valid state in case one or more gateway nodes fail.

To achieve high availability, the cluster of gateway 110 may include n nodes, where n is based on the capacity planning of the gateway 110 and an amount of requests received in targeted usage scenarios. In some embodiments, the minimum value of n is 2.

The number of listeners for each message queue may be adjusted dynamically during the life cycle of gateway 110. For example, the number may change dynamically based on the number nodes in the cluster and the number of active queues in middleware 120.

Some embodiments operate to maintain the required number of listeners per active queue, in response to a dynamic change to the required number or to the failure of one or more listeners (i.e., nodes). This operation, to be described in detail below, may comprise a recovery job scheduled to run on each node based on a predefined frequency. Only one node is assigned the recovery job at any one time. Generally, the recovery job includes iterating through the list of all active queues (e.g., maintained in shared database 170) and ensuring the required number of listeners have been established and are online. In this regard, shared database 170 may also track the health status of each gateway node, in a manner accessible to each gateway node.

Figure 2:
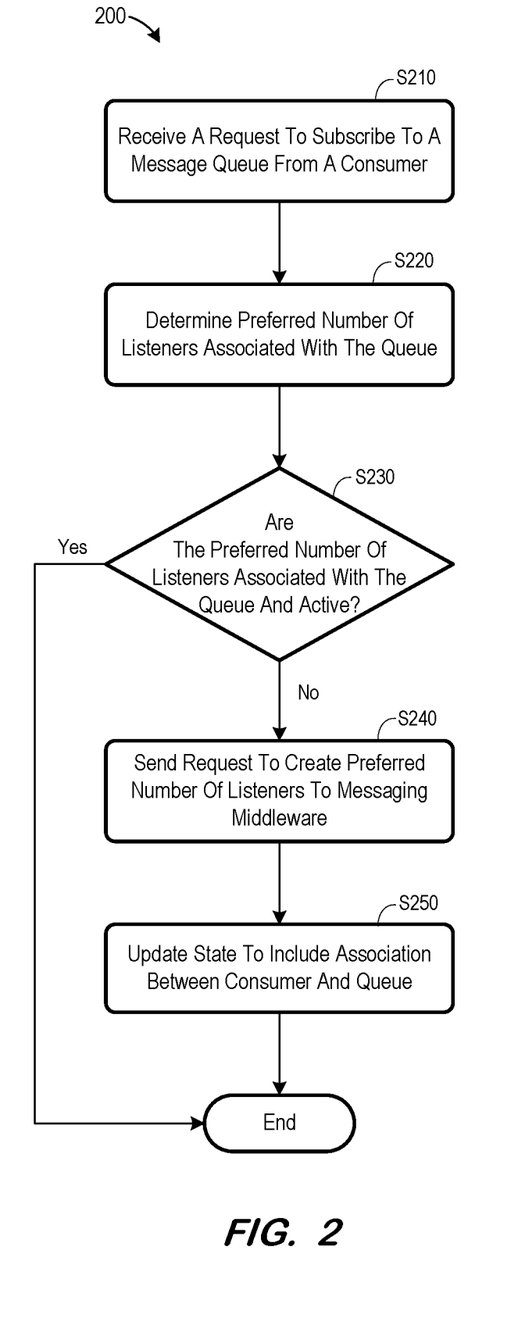
FIG. 2 is a flow diagram of a process to establish subscriptions and listeners according to some embodiments.

FIG. 2 is a flow diagram of process 200 according to some embodiments. Process 200 and the other processes described herein may be performed using any suitable combination of hardware and software. Software embodying these processes may be stored by any non-transitory tangible medium, including but not limited to a fixed disk, non-volatile random access memory, volatile random access memory, a DVD, a Flash drive, or a magnetic tape. Process 200 will be described as performed by a gateway node as noted above, but embodiments are not limited thereto.

Initially, at S210, a request is to subscribe to a message queue is received from a consumer. The request may conform to an HTTP REST API according to some embodiments. The request may indicate a message queue of a messaging middleware component and a callback to the consumer.

Figure 3:
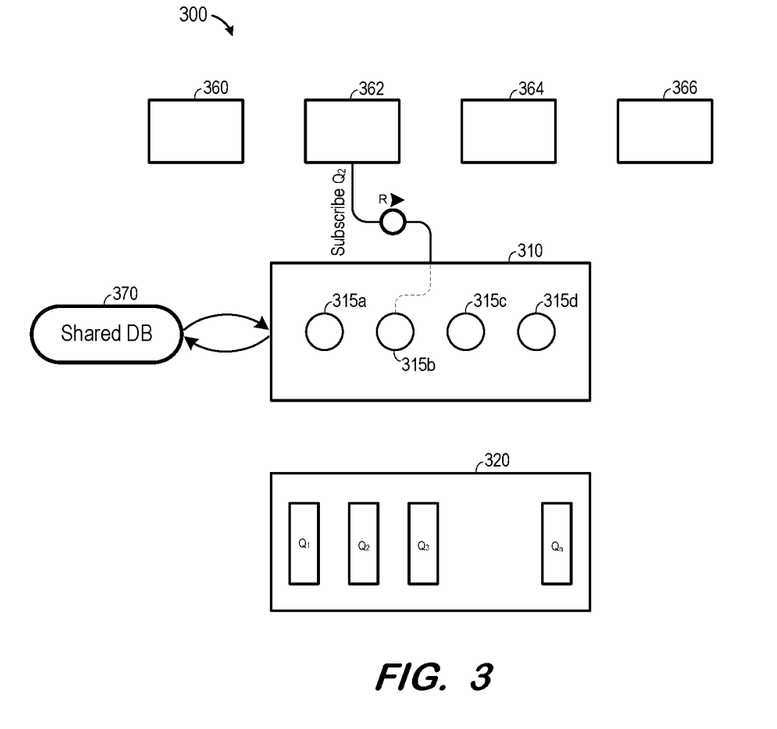
FIG. 3 is a diagram illustrating reception of a subscription request from a consumer which does not support asynchronous messaging according to some embodiments.

FIG. 3 illustrates system 300 including consumers 360 through 366 according to some embodiments. As shown, gateway 310 receives a request from consumer 362 to subscribe to message queue $Q_2$ of messaging middleware 320. Gateway 310 passes the request to one of its nodes (i.e., node 315*b*) based on a load-balancing algorithm. For purposes of the present description, it will be assumed that node 315*b* performs process 200. Accordingly, node 315*b* receives the subscription request at S210.

Next, at S220, a preferred number of listeners associated with the queue is determined. The preferred number of listeners may be determined based on any suitable factors, including desired availability, robustness, cost, etc. In some embodiments, the preferred number of listeners for any queue of messaging middleware 320 is k=MAX(Ceil(n/m), 2), where n is the number of gateway nodes of gateway 310 and m is the number of active queues of messaging middleware 320 with at least one active consumer. Accordingly, the minimum number of listeners is two. For purposes of the present example, it will be assumed that node 315*b* determines at S220 that the preferred number of listeners is three.

At S230, it is determined whether the preferred number of listeners are associated with the queue and are active. Table 400 of FIG. 4 may be stored in shared database 370 and used by gateway node 315*b* at S230 to determine whether the preferred number of listeners are associated with queue $Q_2$ and are active. Each record of table 400 includes, for each queue of middleware 320, a list of all listeners and of all consumers of that queue. Table 400 also specifies a callback associated with each consumer as described above. This data may be stored in shared database 370 in any schema, structure or format, not limited to the flat table of FIG. 4.

Figure 4:
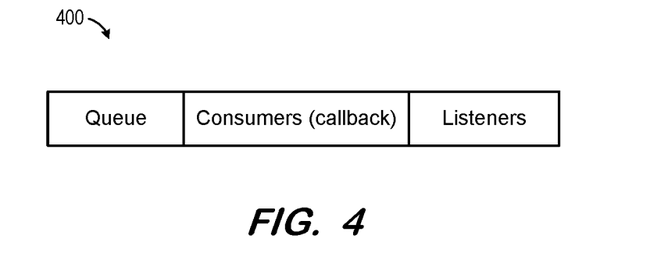
FIG. 4 is a tabular representation of a relational data structure associating message queues of messaging middleware with consumers and listeners according to some embodiments.

It will be assumed that no records exist in table 400 for queue $Q_2$, and therefore it is determined that no listeners are associated with queue $Q_2$. Flow continues to S240, where gateway node 315*b* sends requests to a system queue of messaging middleware 320 to create the preferred number of listeners. According to some embodiments, gateway node 315*b* sends one request for each listener to be created. For example, if it is determined at S220 that four listeners are preferred and at S230 that two listeners are currently associated and active, gateway node sends two requests at S240.

Figure 5:
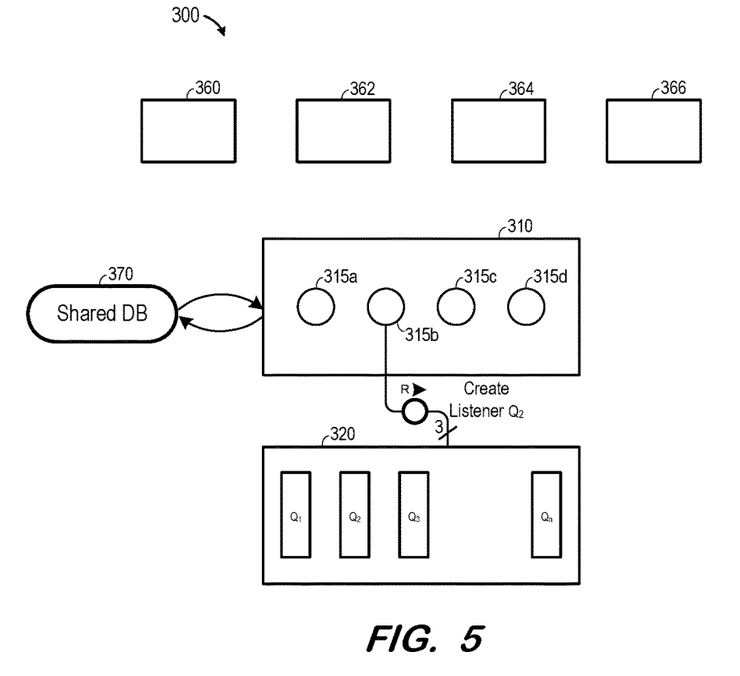
FIG. 5 is a diagram illustrating creation of queue listeners according to some embodiments.
Figure 6:
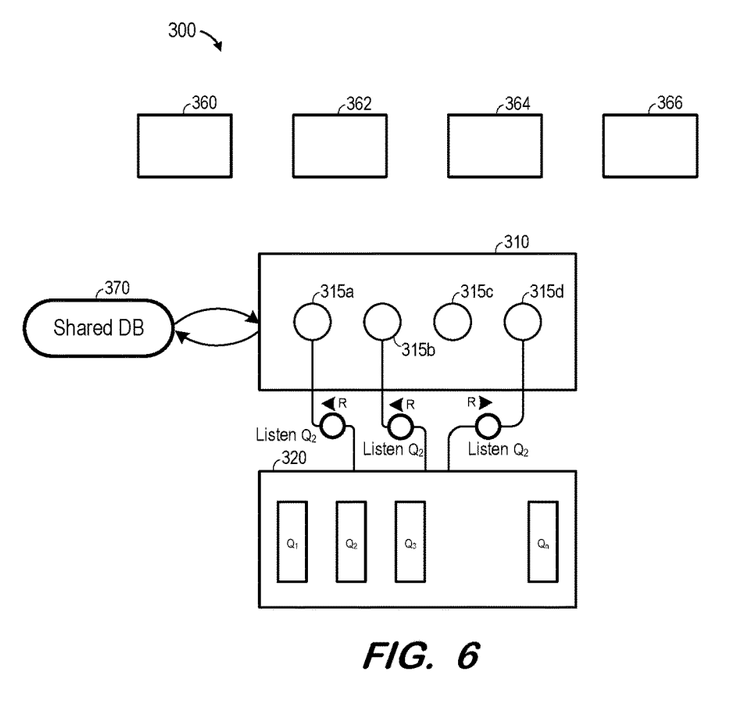
FIG. 6 is a diagram illustrating creation of queue listeners according to some embodiments.

FIG. 5 illustrates the sending of three requests at S240 according to some embodiments. The request may conform to an asynchronous API (e.g., JMS APIs) supported by messaging middleware 320. In response to each request, middleware 320 selects one gateway node to which to transmit a command to listen to queue $Q_2$, as illustrated in FIG. 6. Middleware 320 may determine the selected node for each request based on a load-balancing algorithm, and the selected node may or may not be the node (e.g., 315b) from which the request was received. In this regard, each of nodes 315a through 315d is pre-configured to listen to the system queue of middleware 320, and middleware 320 transmits the commands of FIG. 6 by posting the commands to the system queue.

Figure 7:
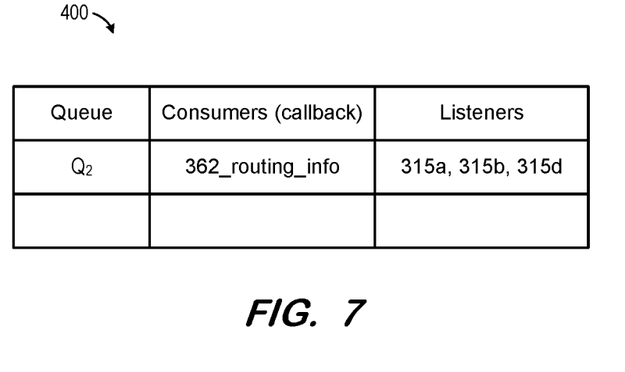
FIG. 7 is a tabular representation of a relational data structure associating a queue, queue listeners and consumers according to some embodiments.
Figure 8:
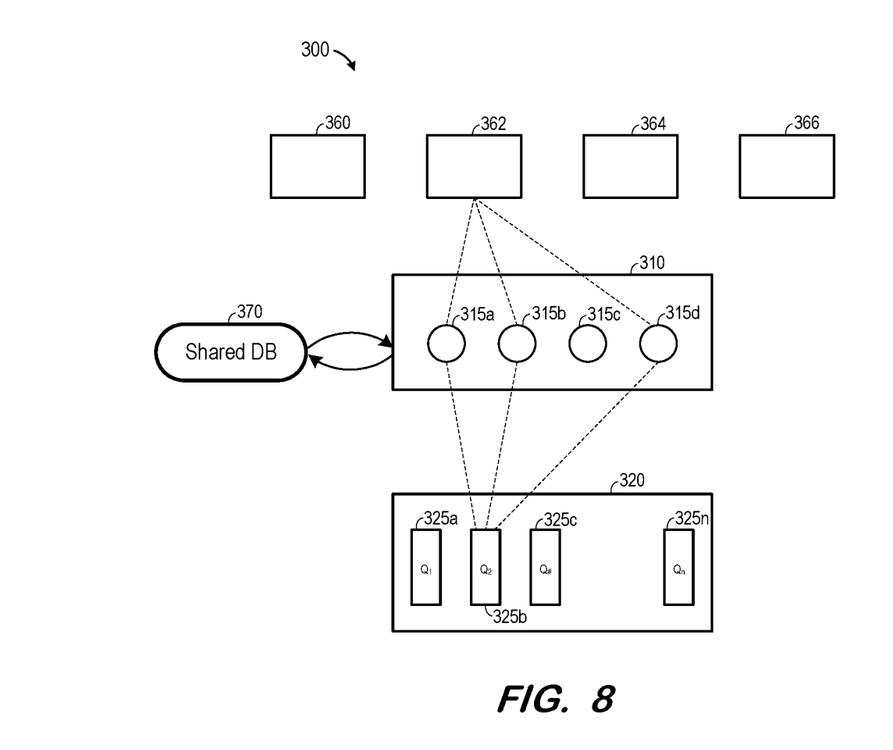
FIG. 8 is a diagram illustrating the association between the queue, queue listeners and consumers of FIG. 7 according to some embodiments.

Each node receiving a command to listen to Q2 updates table 400 to indicate the queue to which it is listening. Also, at S250, the gateway node which received the original subscription request updates table 400 to include an association between the queue and the consumer from which the request was received. FIG. 7 illustrates table 400 including a record establishing the associations established by process 200. These associations are also depicted by the dashed lines of FIG. 8.

Every node of gateway 310 is configured to perform process 200 in a similar manner in response to receiving a subscription request. After receipt of several subscription requests, table 400 includes several records of consumers and listeners associated with queues. The records may associate a same consumer with one or more queues and may also associate a same listener with one or more queues.

The associations specified in the data of shared database 370 may define the global state of system 300 at any given time. The global state is accessible by each node of gateway 310, and may be used during a recovery process as described below to cope with the failure of a node or with a dynamic change to the preferred number of listeners per queue.

Figure 9:
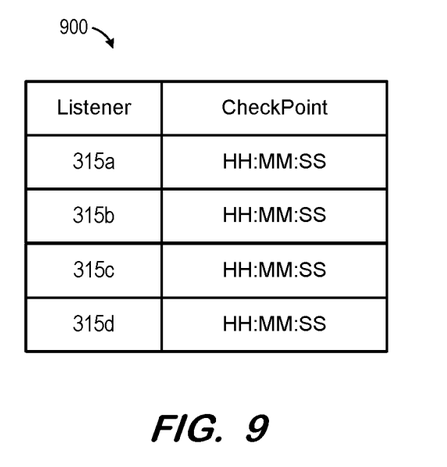
FIG. 9 is a tabular representation of a relational data structure to monitor the state of queue listeners according to some embodiments.
Figure 10:
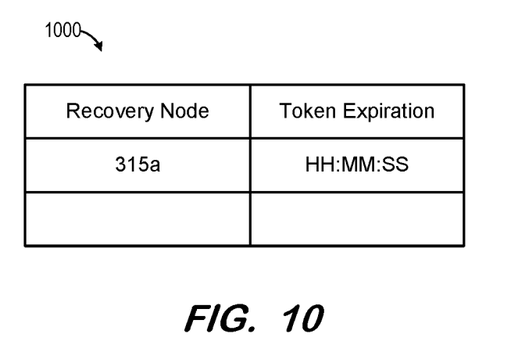
FIG. 10 is a tabular representation of a relational data structure to manage a recovery node according to some embodiments.

Table 900 of FIG. 9 and table 1000 of FIG. 10 may be stored in shared database 370 and may store data used during the recovery process according to some embodiments. Table 900 stores a checkpoint for each listener. For example, each node of gateway 310 is configured to store a timestamp in its associated row of table 900 at a predefined frequency. This timestamp functions as a heartbeat signal allowing another node to determine, by checking the appropriate row of table 900 of shared database 370, whether any other node is active (i.e., associated with a current timestamp) or inactive (i.e., associated with an outdated timestamp).

According to some embodiments, the platform monitors node availability and therefore the data of table 900 is not needed to be separately maintained. In such embodiments, the platform may notify gateway 310 of node failures.

Table 1000 records information related to a recovery job which every gateway node is configured to perform. Specifically, table 1000 indicates a gateway node which is currently assigned to perform the recovery job, and an expiration time for the assignment of the recovery job to the gateway node. In this regard, each node applies to the shared database at a predetermined interval for the recovery job token, and the shared database provides the token (for an expiring amount of time) to a next node to apply after expiration of the previously-granted token.

Figure 11:
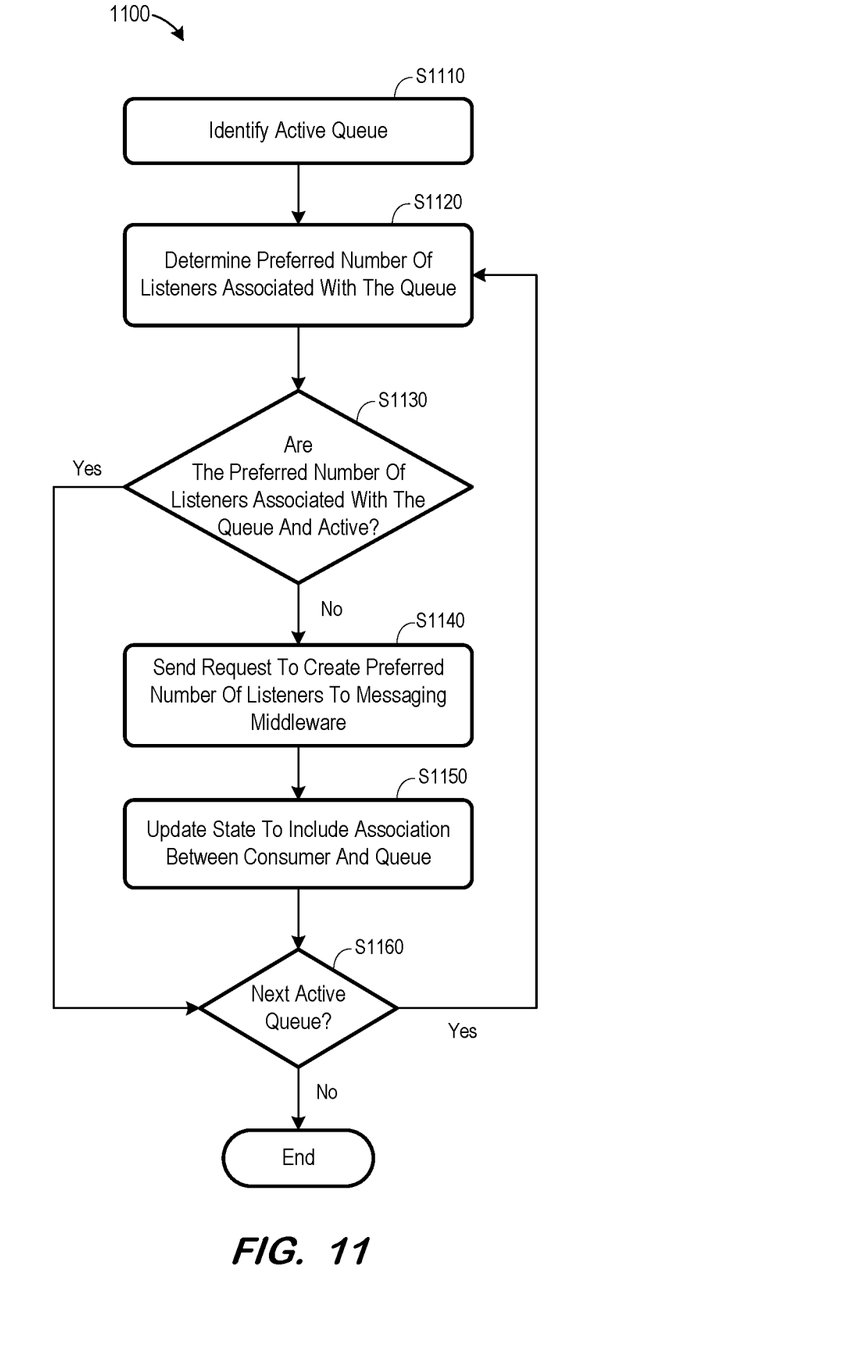
FIG. 11 is a flow diagram of a recovery process according to some embodiments.

FIG. 11 is a flowchart of recovery process 1100 according to some embodiments. Each gateway node is configured to perform process 1100, but process 1100 is only performed by the gateway node in current possession of the recovery token. Process 1100 may be performed in parallel with process 200 if a same gateway node receives a subscription request and the recovery token contemporaneously. In this case, recovery process 1100 ignores the queue associated with the subscription request because process 200 invoked by the subscription request ensures that a preferred number of listeners are associated with the subscribed-to queue.

Process 1100 begins by accessing the data indicative of the global state and stored in shared database 370. An active queue is identified at S1110. An active queue is any queue associated with at least one consumer. With reference to table 400 of FIG. 7, queue $Q_2$ may be identified as an active queue at S1110.

A preferred number of listeners associated with the queue is determined at S1120. S1120 may proceed as described above with respect to S220. It should be noted that the determined number for the active queue may differ from the number which was originally determined for the queue, due to changes to the factors based on which the number is determined. For purposes of the current example, it will be assumed that the determined number is three.

At S1130, it is determined whether the preferred number of listeners are associated with the queue and are active. Table 400 of FIG. 7 shows three listeners associated with queue Q2, and it will be assumed that each of the three listeners is associated with a recent heartbeat timestamp in table 900 of shared database 370. Accordingly, flow proceeds from S1130 to S1160 to determine whether the global state includes another active queue (e.g., another record in table 400). If so, flow returns to S1120.

Figure 12:
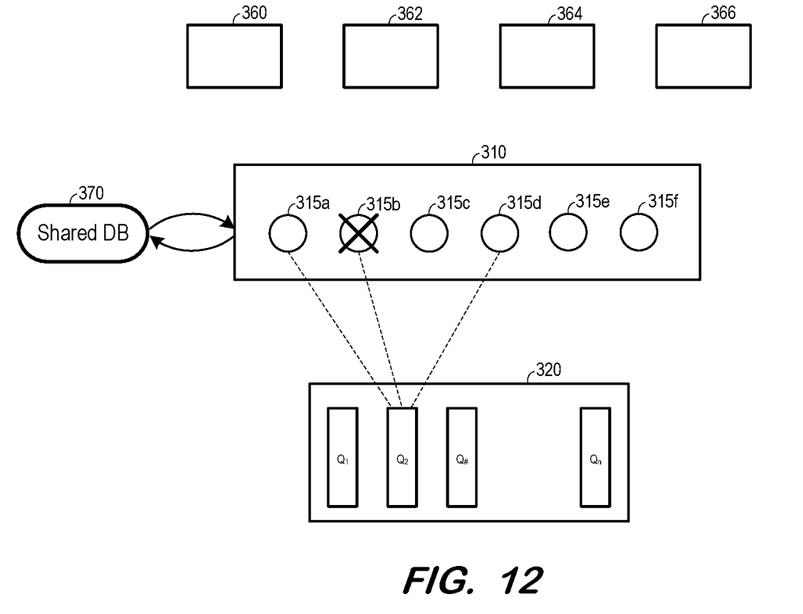
FIG. 12 illustrates failure of a gateway node according to some embodiments.

FIG. 12 continues the present example by illustrating a scenario which developed after creation of three listeners associated with queue $Q_2$ as described above. Specifically, two new nodes 315e and 315f have been instantiated in gateway 310, and node 315b is inactive (i.e., no longer updating shared database 310 with heartbeat timestamps). Accordingly, only nodes 315a and 315d are listening to queue $Q_2$.

It will now be assumed that the recovery job is assigned to one of the nodes of gateway 310 as described above. The recovery job is assigned due to expiration of a prior recovery job assignment, and not due to the failure of node 315b.

Figure 13:
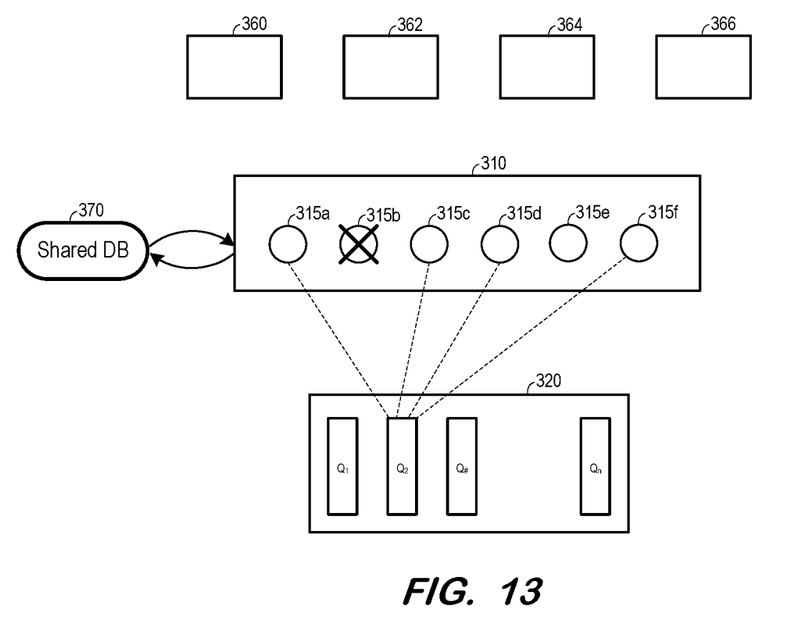
FIG. 13 illustrates recovery from the failure of a gateway node according to some embodiments.
Figure 14:
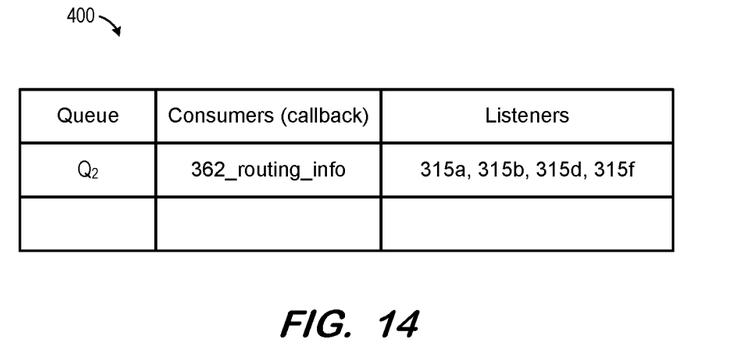
FIG. 14 is a tabular representation of a relational data structure associating the queue, queue listeners and consumers of FIG. 13 according to some embodiments.

The node identifies queue $Q_2$ as an active queue at S1110 based on table 400 as described above. It will also be assumed that the preferred number of listeners is now four (perhaps due to the presence of additional nodes within gateway 310). At S1130, it is determined based on table 900 that only two of the three listeners associated with queue $Q_2$ are active, and that two additional listeners must therefore be created. S1140 and S1150 are performed as described with respect to S240 and S250 to create the required additional listeners. FIG. 13 illustrates the resulting associations, with queue $Q_2$ being associated with listeners 315a, 315c, 315d and 315f. Table 400 of FIG. 14 is also updated by each new listener to reflect the updated listener associations.

If it is determined at S1130 that an active queue is associated with more than the preferred number of listeners (e.g., due to a dynamic reduction in the preferred number of listeners), the shared database may be updated to removes associations between the active queue and the number of superfluous listeners. Alternatively, in some embodiments, all existing listeners may be marked as inactive prior to S1140. Then, at S1140, requests are sent to create the preferred number of listeners. As a result, the listener associations are re-distributed to a set of nodes which were not previously listening to the queue.

At some point during operation, a queue may be associated with no consumers. For example, a subscription may expire or be withdrawn. Some embodiments therefore provide a cleanup job as a first part of the above-described recovery job. During the cleanup job, the node purges the global state of shared database 310 of associations to inactive queues (i.e., queues associated with no consumers), to all dead gateway nodes (i.e., based on received heartbeat timestamps), and all listeners associated with dead gateway nodes. The node then performs the recovery job as described above.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
   a shared database;
   a messaging middleware software component comprising a plurality of message queues;
   a plurality of consumer software components to subscribe to one or more of the plurality of message queues of the messaging middleware software component; and
   a cluster of computing nodes, wherein data stored in the shared database is accessible to each computing node of the cluster, wherein each computing node of the cluster is to:
      receive, from each of the plurality of consumer software components, requests to subscribe to one or more of the message queues of the messaging middleware software component;
      in response to a received request to subscribe to a message queue of the messaging middleware software component, determine a preferred number of computing nodes of the cluster of computing nodes to listen to the message queue;
      determine, based on data stored in the shared database, a current number of computing nodes of the cluster of computing nodes listening to the message queue; and
      based on a difference between the preferred number and the current number, send one or more requests to the messaging middleware software component to instruct one or more computing nodes of the cluster which are not listening to the message queue to listen to the message queue.

2. A system according to claim 1, wherein the request to subscribe conforms to a Representational State Transfer Application Programming Interface and the one or more requests to the messaging middleware software component conform to a Java Message Service Application Programming Interface.

3. A system according to claim 1, each of the computing nodes configured to perform a recovery job by:
   identifying an active message queue based on data of the shared database;
   determining a preferred number of computing nodes to listen to the active message queue;
   determining, based on data stored in the shared database, a current number of computing nodes listening to the active message queue; and
   based on a difference between the preferred number and the current number, send one or more requests to the messaging middleware software component to associate one or more of the computing nodes with the active message queue.

4. A system according to claim 3, wherein each computing node periodically applies for the recovery job, and wherein only one computing node at a time is assigned to the recovery job.

5. A system according to claim 1, wherein determination of the preferred number of computing nodes to listen to the message queue is based on a number of active message queues of the messaging middleware component and a number of computing nodes in the cluster.

6. A computer-implemented method comprising:
   receiving, at a first computing node in a cluster of computing nodes, a request from a consumer software component to subscribe to a first message queue of a messaging middleware software component comprising a plurality of message queues;
   in response to the received request to subscribe to the first message queue of the messaging middleware software component, determining, at the first computing node, a preferred number of computing nodes of the cluster of computing nodes to listen to the first message queue;
   determining, at the first computing node and based on data stored in a shared database accessible to each computing node of the cluster of computing nodes, a current number of computing nodes of the cluster which are listening to the first message queue; and
   sending, from the first computing node and based on a difference between the preferred number and the current number, one or more requests to the messaging middleware software component to instruct one or more of the computing nodes of the cluster of computing nodes which are not listening to the first message queue to listen to the first message queue.

7. A method according to claim 6, wherein the request to subscribe conforms to a Representational State Transfer Application Programming Interface and the one or more requests to the messaging middleware software component conform to a Java Message Service Application Programming Interface.

8. A method according to claim 6, further comprising a recovery job comprising:
   identifying an active message queue based on data of the shared database;
   determining a preferred number of computing nodes of the cluster to listen to the active message queue;
   determining, based on data stored in the shared database, a current number of computing nodes of the cluster listening to the active message queue; and
   based on a difference between the preferred number and the current number, sending one or more requests to the messaging middleware software component to associate one or more of the computing nodes of the cluster with the active message queue.

9. A method according to claim 8, wherein each computing node periodically applies for the recovery job, and wherein only one computing node at a time is assigned to the recovery job.

10. A method according to claim 6, wherein determining the preferred number of computing nodes to listen to the message queue is based on a number of active message queues of the messaging middleware component and a number of computing nodes in the cluster.

11. A computer-readable medium storing processor-executable process steps that, when executed by a computing node of a cluster of computing nodes, cause the computing node to:
- receive, at the computing node, a request from a consumer software component to subscribe to a first message queue of a messaging middleware software component comprising a plurality of message queues;
- in response to the received request to subscribe to the first message queue of the messaging middleware software component, determine a preferred number of computing nodes of a cluster of computing nodes to listen to the first message queue;
- determine, based on data stored in a shared database, a current number of computing nodes of the cluster of computing nodes which are listening to the first message queue; and
- based on a difference between the preferred number and the current number, send one or more requests to the messaging middleware software component to instruct one or more of the computing nodes of the cluster of computing nodes which are not listening to the first message queue to listen to the first message queue.

12. A medium according to claim 11, wherein the request to subscribe conforms to a Representational State Transfer Application Programming Interface and the one or more requests to the messaging middleware software component conform to a Java Message Service Application Programming Interface.

13. A medium according to claim 11, further comprising processor-executable process steps that, when executed by the computing node, cause the computing node to:
- identify an active message queue based on data of the shared database;
- determine a preferred number of computing nodes of the cluster to listen to the active message queue;
- determine, based on data stored in the shared database, a current number of computing nodes of the cluster listening to the active message queue; and
- based on a difference between the preferred number and the current number, sendone or more requests to the messaging middleware software component to associate one or more of the computing nodes of the cluster with the active message queue.

14. A medium according to claim 11, wherein determination of the preferred number of computing nodes to listen to the message queue is based on a number of active message queues of the messaging middleware component and a number of computing nodes in the cluster.

* * * * *